Patented May 8, 1923.

1,454,617

UNITED STATES PATENT OFFICE.

EUGENE E. AYRES, JR., OF CHESTER, PENNSYLVANIA, ASSIGNOR TO THE SHARPLES SPECIALTY COMPANY, OF PHILADELPHIA, PENNSYLVANIA, A CORPORATION OF DELAWARE.

PROCESS FOR THE PREVENTION OF THE FORMATION OF EMULSIONS.

No Drawing.   Application filed February 24, 1921. Serial No. 447,567.

*To all whom it may concern:*

Be it known that I, EUGENE E. AYRES, Jr., a citizen of the United States, residing at Chester, in the county of Delaware and State of Pennsylvania, have invented a new and useful Process for the Prevention of the Formation of Emulsions, of which the following is a specification.

This invention is a process for the prevention of the formation of emulsions of immiscible liquids by the use of a reagent that is dissolved in one liquid which it is desired to keep free from another, and that will prevent the other or second liquid from emulsifying with the first liquid.

The primary purpose of my invention is to prevent the formation of emulsions under circumstances where emulsions are ordinarily formed and where the emulsion is undesirable. Particular applications of the process are in the prevention of the formation of emulsions of water-in-oil produced by the seepage of water into oil storage tanks and the prevention of the formation of the emulsions of oil-in-water produced in the water washing of alkaline oils by percolation.

It is well known that if oil and water are put in contact with each other, with moderate agitation, a stable emulsion may be formed if an emulsifying colloid be present in the oil or in the water. For the purpose of simplifying the description, those emulsifying colloids which tend to give emulsions of continuous oil and dispersed water are designated herein as hydrophobes, while those emulsifying colloids which tend to give emulsions with continuous water and dispersed oil are designated herein as hydrophiles.

Oil containing a hydrophobe colloid will tend to form a water-in-oil emulsion, in which the water is discontinuous or dispersed in the continuous oil. Conversely, water containing a hydrophile colloid will tend to form an oil-in-water emulsion, in which water is continuous and the oil discontinuous or dispersed therein. The form which an emulsion takes depends upon the predominant emulsifying colloid. For example, crude petroleum contains a hydrophobe colloid, and if fresh water or salt water is moderately agitated therewith the tendency is to form an emulsion in which the water is suspended or dispersed in the crude petroleum. Sodium soap is an example of a hydrophile colloid and if this soap is dissolved in water the soapy solution tends to form an emulsion in which oil is discontinuous or suspended as globules in the soap water. If soap is present in a relatively large amount, this hydrophile colloid (soap) exerts a stronger tendency than the hydrophobe colloid in crude petroleum, and the result is an emulsion with continuous water.

I have found it possible to prepare reagents comprising hydrophile colloids, which reagents are soluble or colloidally dispersed in oil, and reagents comprising hydrophobe colloids, which reagents are soluble or colloidally dispersed in water. I have found that when such oil soluble hydrophile colloids are dissolved in oil, it may be very difficult or even impossible to produce stable emulsions of water-in-oil by agitation, and conversely when water soluble hydrophobe colloids are dissolved in water, it may be very difficult or even impossible to produce stable emulsions of oil-in-water by agitation.

As an example of the practice of my invention, I have dissolved 1% of a reagent, consisting of about 25% of rosin soap, 35% free rosin and 40% water, in fuel oil, and found that on agitation of the thus treated fuel oil with fresh or salt water, the formation of emulsions of water-in-oil is either prevented or else emulsions that may be formed by violent agitation are unstable and settle readily by gravity.

Sodium rosin soap is a strong hydrophile colloid and yet the reagent as prepared is readily dispersible in fuel oil. Sodium rosin soap is itself slightly soluble in hydrocarbon oils, but the presence of free rosin, in which the soap is very soluble and which itself is very soluble in oils, renders the reagent colloidally dispersible in all proportions. This rosin-soap mixture is mentioned because it is economical and readily obtainable, but it will be understood that there are many reagents that will do as efficient work in preventing water from emulsifying in oil. The only requirements for this type of reagent are that it shall contain a hydrophile colloid and that such reagent shall be colloidally soluble in oil.

As another example, I have found that the addition of an aqueous suspension of iron oleate, to the water used for washing by percolation acid and alkali treated lubricating oils, will prevent to a large extent the emulsification of oil in the wash water. A sufficiently permanent suspension of iron oleate may be conveniently formed by the addition of iron sulphate to a dilute solution of a sodium soap. The suspension is dispersible in water and yet it comprises a hydrophobe colloid.

It will be understood that there are many reagents suitable for the prevention of the formation of emulsions of oil-in-water. The only requirements are that the reagent should be colloidally soluble in water and yet contain a hydrophobe colloid.

Having described my invention, I claim:

1. The process of preventing the formation of emulsions of two liquids which consists in the addition to the liquid, which it is desired to keep free from dispersed globules of the other liquid, of a reagent capable of dispersing as a colloid in the liquid first named and of acting as an emulsifying colloid tending to disperse the first in the second liquid.

2. The process of preventing the formation of emulsions of two liquids which consists in the addition to the liquid, which it is desired to keep free from dispersed globules of the other liquid, of a reagent comprising a solution of a substance, capable of acting as an emulsifying colloid tending to disperse the first in the second liquid, in a substance soluble in said first liquid.

3. The process of preventing the formation of emulsions of liquids which consists in adding to one of said liquids a reagent composed of a substance, capable of acting as an emulsifying colloid tending to disperse such liquid in another of said liquids, and of another substance in which the liquid first named and the aforesaid emulsifying colloid are mutually soluble.

4. The process of preventing the formation of emulsions of liquids which consists in dissolving a substance, capable of acting as an emulsifying colloid tending to disperse one of said liquids in another thereof, in a substance adapted to produce therewith a reagent colloidally dispersible in the liquid first named, and adding the reagent to the liquid first named.

5. The process of preventing the formation of emulsions of the type of water-in-oil which consists in the addition to the oil of a reagent which has the property of dispersing as a colloid in the oil and which comprises.

6. The process of preventing the formation of water-in-oil emulsions, which consists in the addition to the oil of a reagent composed of a solution of a hydrophile colloid in a substance soluble in the oil, said reagent being characterized by its tendency to cause the formation of emulsions of oil-in-water.

7. The process of preventing the formation of water-in-oil emulsions which consists in the addition to the oil of a reagent composed of a hydrophile colloid dissolved in a substance in which the hydrophile colloid and the oil are mutually soluble.

8. The process of preventing the formation of water-in-oil emulsions which consists in dissolving a hydrophile colloid in a substance adapted to produce therewith a reagent colloidally soluble in the oil, and adding the reagent to the oil.

9. The process of preventing the formation of water-in-oil emulsions which consists in the addition to the oil of a reagent composed of a solution of sodium resinate in a substance soluble in the oil.

10. The process of preventing the formation of water-in-oil emulsions which consists in the addition to the oil of a reagent composed of sodium resinate dissolved in a substance in which the oil and the sodium resinate are mutually soluble.

11. The process of preventing the formation of water-in-oil emulsions which consists in dissolving resinate in a substance adapted to produce therewith a reagent colloidally soluble in the oil, and adding the reagent to the oil.

12. The process of preventing the formation of petroleum emulsions which consists in the addition to the petroleum of a reagent composed of a solution of sodium resinate in a substance soluble in petroleum.

13. The process of preventing the formation of petroleum emulsions which consists in the addition to the petroleum of a reagent composed of sodium resinate dissolved in a substance in which petroleum and sodium resinate are mutually soluble.

14. The process of preventing the formation of petroleum emulsions which consists in dissolving sodium resinate in a substance adapted to produce therewith a reagent colloidally soluble in petroleum, and adding the reagent to the petroleum.

In testimony whereof I have hereunto set my name this 23rd day of February, 1921.

EUGENE E. AYRES, Jr.

Certificate of Correction.

It is hereby certified that in Letters Patent No. 1,454,617, granted May 8, 1923, upon the application of Eugene E. Ayres, jr., of Chester, Pennsylvania, for an improvement in "Processes for the Prevention of the Formation of Emulsions," an error appears in the printed specification requiring correction as follows: Page 2, after line 58, claim 5, insert the words *a hydrophile colloid;* and that the said Letters Patent should be read with this correction therein that the same may conform to the record of the case in the Patent Office.

Signed and sealed this 19th day of June, A. D., 1923.

[SEAL.]

WM. A. KINNAN,
*Acting Commissioner of Patents.*